Patented June 23, 1936

2,045,475

UNITED STATES PATENT OFFICE 2,045,475

STABLE REDUCTION COMPOUNDS OF THE 4.7.4'.7'-TETRA - ALKYL - 5.5' - DIHALOGEN-THIOINDIGOS AND A PROCESS OF PREPARING THEM

Karl Krauss, Frankfort-on-the-Main-Fechenheim, and Alfred Hagenböcker, Frankfort-on-the-Main-Hochst, Germany, assignors to General Aniline Works, Inc., New York, N. Y., a corporation of Delaware No Drawing. Application April 4, 1930, Serial No. 441,721. Renewed June 27, 1934. In Germany April 15, 1929

4 Claims. (Cl. 260—53)

The present invention relates to new stable reduction compounds of the 4.7-4'.7'-tetra-alkyl-5.5'-dihalogen-thioindigos.

We have found that new stable reduction compounds of the 4.7-4'.7'-tetra-alkyl-5.5'-dihalogen-thioindigos of the formula:

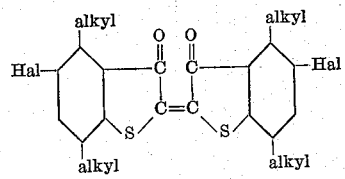

are obtainable by treating the said dyestuffs in an aqueous suspension and at an elevated temperature with quantities of an alkali and of a reducing agent which are smaller than the quantities commonly used in preparing vats of the dyestuffs in question.

A specific mode of carrying out our process which has proved to yield good results is described in the examples hereafter following.

Our new reduction compounds are stable to air and oxygen and only difficultly soluble in alkali which facts prove that they are different from the leuco compounds of the 4.7-4'.7'-tetra-alkyl-5.5'-dihalogen-thioindigos which, as is well known, are easily soluble in alkali and are reconverted by air into the dyestuffs proper. They are capable of yielding prints in the same way as the dyestuffs themselves, but with our new stable products prints are also obtainable when employing considerably smaller quantities of the reducing agent than are necessary with the dyestuffs proper, which fact proves that our new stable products are reduction compounds of the dyestuffs.

The following examples illustrate the invention, but they are not intended to limit it thereto, the parts being by weight:

(1) 267 g. of 4.7-4'.7'-tetramethyl-5.5'-dichlorothioindigo of the formula:

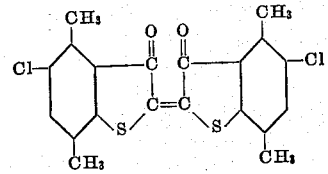

in the form of an aqueous 15% paste are mixed with 1,000 cc. of water and 44 cc. of caustic soda solution of 33° Bé., and the mixture is then heated to 70°–75° C. 22.5 g. of sodium hydrosulfite concentrated powder are added, and the whole is stirred for half an hour while the said temperature is maintained. The stable reduction product is thus obtained in a crystallized form; it is practically insoluble in the liquid having still a distinctly alkaline reaction and it is nearly colorless. By filtering, washing and grinding the product is brought into a proper form for use.

(2) 267 g. of 4.7-4'.7'-tetramethyl-5.5'-dichlorothioindigo of the formula given in the foregoing example in the form of an aqueous paste are mixed with 600 cc. of water, 200 cc. of alcohol and 45 cc. of caustic soda solution of 33° Bé. The mixture is heated to 70° C.–75° C., 22.5 g. of sodium hydrosulfite concentrated powder are added, and the whole is stirred for half an hour. Carbon dioxide is then introduced until the mass shows a bicarbonate alkaline reaction while cooling the mixture externally to about 30° C.–35° C.

The stable reduction product thus obtained is filtered, washed and ground. It is advantageous to stir the paste once more with dilute mineral acid.

We claim:

1. The stable reduction products of the 4.7-4'.7'-tetramethyl-5.5'-dihalogen-thioindigos, the said products being stable to air and oxygen, being difficultly soluble in alkali and yielding prints in the usual way but also with considerably smaller quantities of the reducing agent than are required in the case of the dyestuffs proper.

2. The stable reduction product of 4.7-4'.7'-tetramethyl - 5.5' - dichlorothioindigo, the said product being stable to air and oxygen, being difficultly soluble in alkali and yielding prints in the usual way but also with considerably smaller quantities of the reducing agent than are required in the case of the dyestuff proper.

3. The process which comprises treating a 4.7-4'.7'-tetramethyl-5.5'-dihalogen-thioindigo in an aqueous suspension and while heating with quantities of an alkali and of a reducing agent which are smaller than the quantities commonly used in preparing the vat of the dyestuff in question.

4. A stable reduction product of a tetramethyl-dihalogenated-thioindigo.

KARL KRAUSS.
ALFRED HAGENBÖCKER.